(12) United States Patent
Ise

(10) Patent No.: US 9,942,448 B2
(45) Date of Patent: Apr. 10, 2018

(54) DISPLAY CONTROL APPARATUS AND METHOD FOR CONTROLLING THE SAME

(71) Applicant: CANON KABUSHIKI KAISHA, Tokyo (JP)

(72) Inventor: Toshimichi Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/478,890

(22) Filed: Apr. 4, 2017

(65) Prior Publication Data

US 2017/0295299 A1   Oct. 12, 2017

(30) Foreign Application Priority Data

Apr. 11, 2016   (JP) ................. 2016-079077

(51) Int. Cl.
*H04N 1/60*   (2006.01)
*H04N 5/232*   (2006.01)
*H04N 5/265*   (2006.01)

(52) U.S. Cl.
CPC ........... *H04N 1/6027* (2013.01); *H04N 1/60* (2013.01); *H04N 5/23216* (2013.01); *H04N 5/23293* (2013.01); *H04N 5/265* (2013.01); *H04N 2201/0084* (2013.01)

(58) Field of Classification Search
CPC ........... H04N 1/6027; H04N 5/23216; H04N 5/23293; H04N 5/265; H04N 2201/0084
See application file for complete search history.

(56) References Cited

U.S. PATENT DOCUMENTS 5,343,238 A * 8/1994 Takata ............... G06T 3/4007
                                                348/556
2006/0176311 A1* 8/2006 Kimoto ............ H04N 9/3182
                                                345/589

FOREIGN PATENT DOCUMENTS

JP   H08-69518 A   3/1996

* cited by examiner

*Primary Examiner* — Tuan Ho
(74) *Attorney, Agent, or Firm* — Canon U.S.A., Inc. IP Division

(57) ABSTRACT

A display control apparatus includes one or more processors, a conversion unit configured to convert a color of the image based on a predetermined condition, and a display control unit configured to perform control such that, in a case where a non-color-converted image is displayed in which the color of the non-color-converted image is not converted, a display item is displayed at a superimposed position at which the display item is superimposed on the image, and in a case where a color-converted image is displayed in which the color of the color-converted image is converted, the display item is displayed at a non-superimposed position at which the display item is not superimposed on the color-converted image.

15 Claims, 7 Drawing Sheets

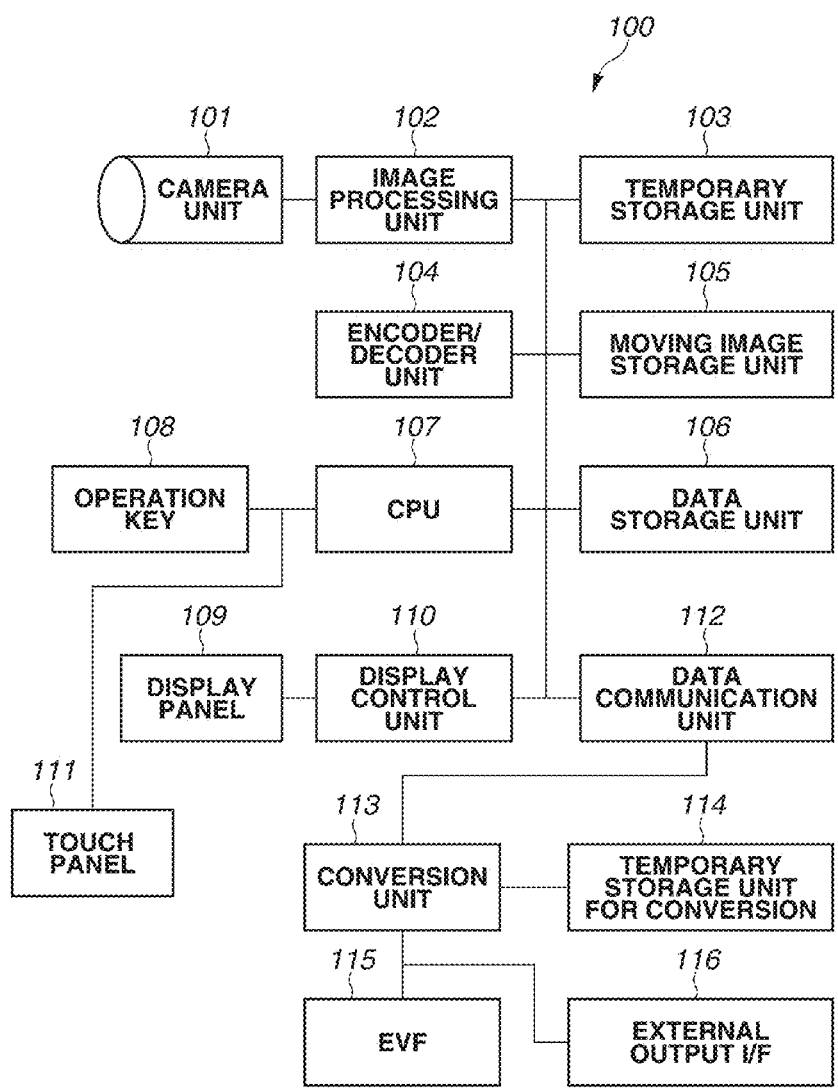

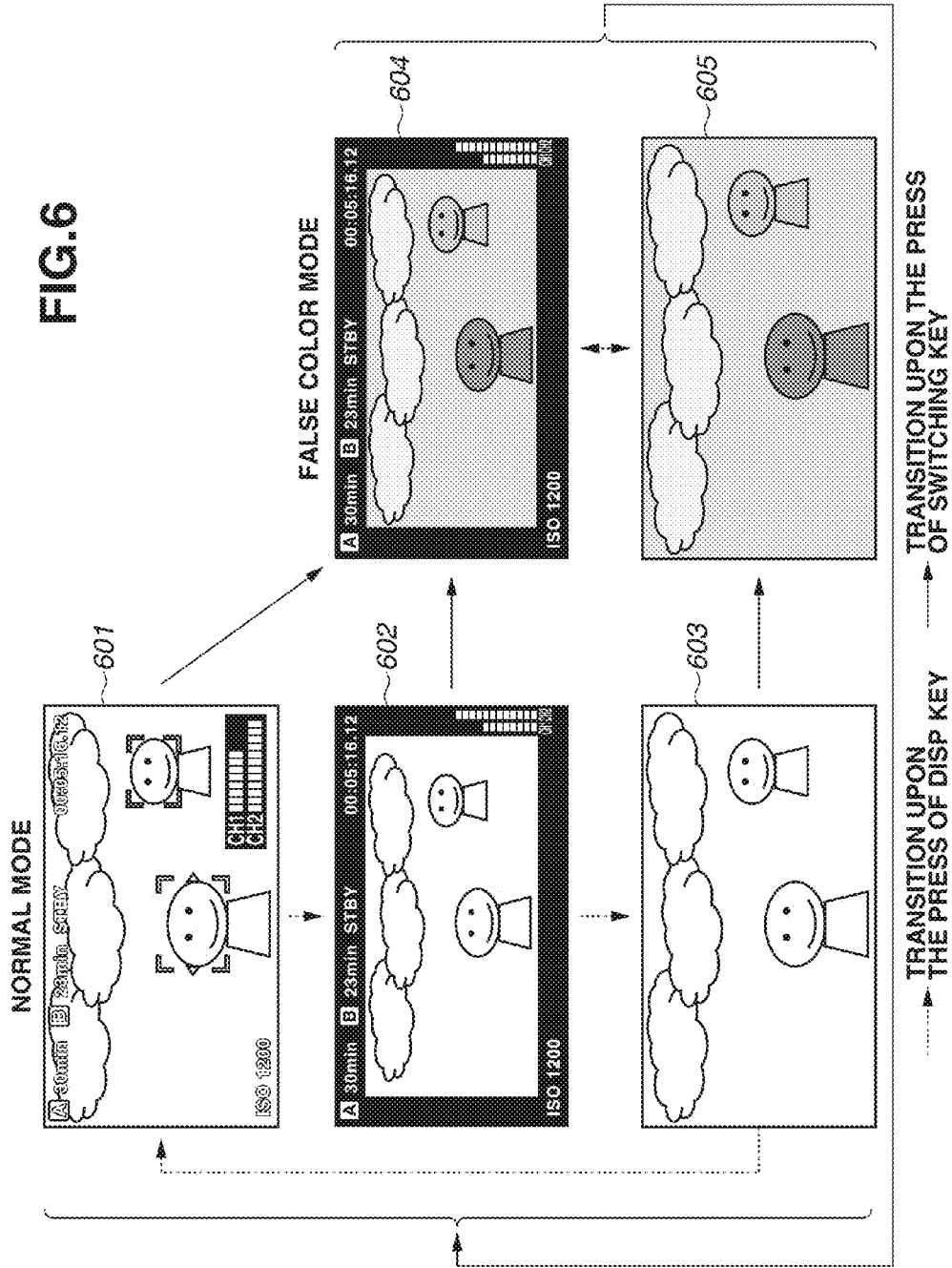

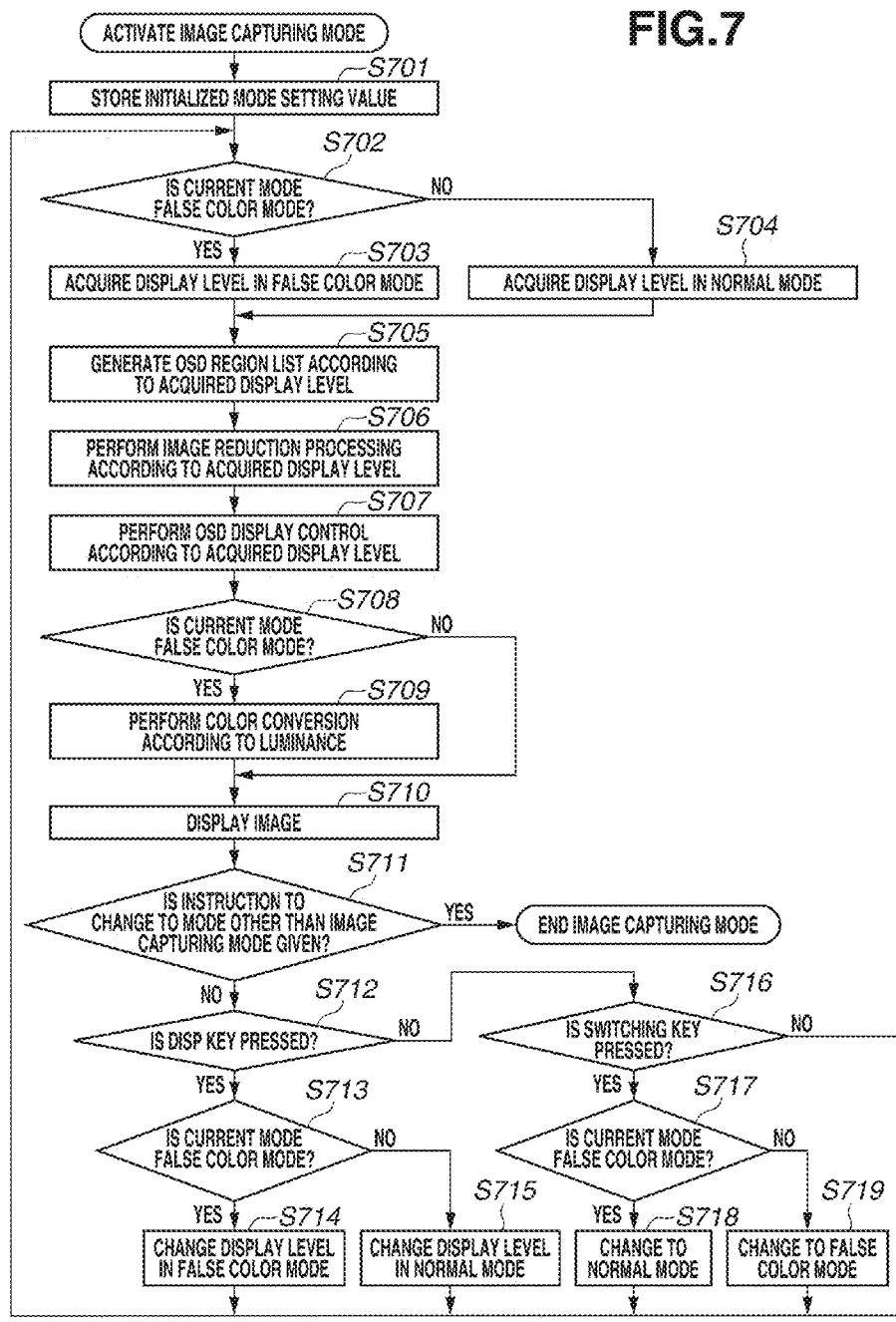

DISPLAY CONTROL APPARATUS AND METHOD FOR CONTROLLING THE SAME

BACKGROUND

Field of Art

The present disclosure relates to a display control apparatus and a method for controlling the same.

Description of the Related Art

In recent years, display control apparatuses having various assistance functions in displaying an image on a display unit have been widely used. Japanese Patent Application Laid-Open No. H08-69518 discusses a color image processing apparatus capable of changing a color that cannot be output into the closest color to the color, among colors that can be output, with color conversion based on a specific rule.

When such a color-converted image is displayed, there is sometimes a demand for displaying a display item, such as an on-screen display (OSD), together with the color-converted image. However, with the display item being superimposed and displayed on the color-converted image, the color-converted image and the display item are mixed up, resulting in a decrease in visibility of the image and the display item.

SUMMARY

The present disclosure is directed to a technique for increasing visibility of a color-converted image and a display item in a case where the color-converted image and the display item are displayed together.

A display control apparatus configured to control a display of an image includes one or more processors, a conversion unit configured to convert a color of the image based on a predetermined condition, and a display control unit configured to perform control such that in a case where a non-color-converted image is displayed in which the color of the non-color-converted image is not converted, a display item is displayed at a superimposed position at which the display item is superimposed on the image, and in a case where a color converted image is displayed in which the color of the color-converted image is converted, the display item is displayed at a non-superimposed position at which the display item is not superimposed on the color-converted image.

Further features will become apparent from the following description of exemplary embodiments with reference to the attached drawings.

BRIEF DESCRIPTION OF THE DRAWINGS

FIG. 1 is a block diagram illustrating an example of an internal configuration of a video camera.

FIG. 6 illustrates an example of screen transitions.

FIG. 7 is a flow chart illustrating an example of display control of a video camera.

DESCRIPTION OF THE EMBODIMENTS

Figure 2A:
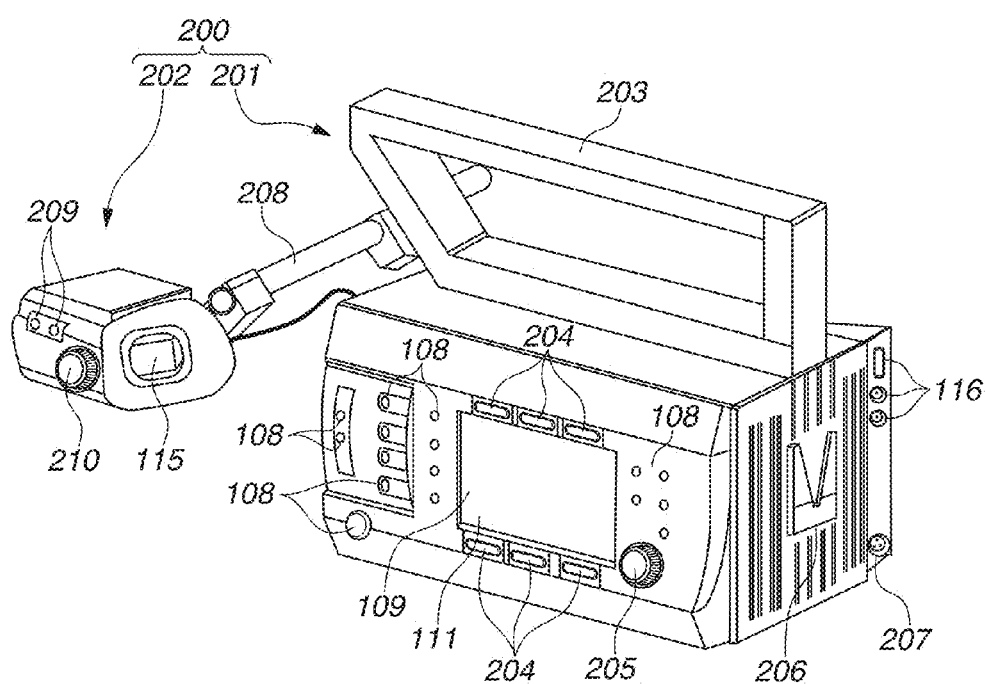
FIGS. 2A and 2B each illustrate an example of an external configuration of a video camera.

An exemplary embodiment will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

In exemplary embodiments a digital video camera (hereinafter, "video camera") for business use will be described as an example of a display control apparatus. The video camera according to the exemplary embodiments can be set to a false color mode in which colors of captured images are converted according to luminance of the captured images. The false color mode according to the present exemplary embodiment refers to a mode in which colors of images are converted into, for example, purple, blue, green, pink, yellow, and red according to luminance and the color-converted images are displayed.

A first exemplary embodiment is described below. FIG. 1 is a block diagram illustrating an internal configuration of a video camera 100.

The video camera 100 includes a camera unit 101, an image processing unit 102, a temporary storage unit 103, an encoder/decoder unit 104, a moving image storage unit 105, a data storage unit 106, a central processing unit (CPU) 107, an operation key 108, a display panel 109, a display control unit 110, and a touch panel 111. The video camera 100 further includes a data communication unit 112, a conversion unit 113, a temporary storage unit 114 for conversion, an electronic viewfinder (EVF) 115, and an external output interface (I/F) 116 among other components.

The CPU 107 is an arithmetic unit which reads a program from the data storage unit 106 and controls operations of the entire video camera 100 according to the program. The CPU 107 concurrently executes a plurality of tasks according to the read program. Specifically, the CPU 107 executes a "mode control task", "camera control task", "recorder control task", and "display control task". The CPU 107 functions as an example of a display control unit and a storage control unit.

The camera unit 101 is an image capturing unit and includes a mechanism for inputting analog video signals to the video camera 100. More specifically, the camera unit 101 includes a lens which focuses light from an object to form an image of the object, an image sensor which photoelectrically converts the object image formed by the lens, and a circuit which drives the image sensor.

The image processing unit 102 converts the analog video signals input from the camera unit 101 into digital image data and performs predetermined image processing, such as noise removal processing, to correct the digital image data.

The operations of the camera unit 101 and the image processing unit 102 are controlled by the "camera control task" executed by the CPU 107.

The temporary storage unit 103 partially functions as a work area of the CPU 107, and includes an image frame buffer and on-screen display data (OSD) frame buffer (described below).

The encoder/decoder unit 104 encodes the image data from the image processing unit 102. The image data encoded by the encoder/decoder unit 104 is temporarily stored in the temporary storage unit 103, and then stored in the moving image storage unit 105 together with accompanying management data. In reproduction of moving images, conversely, the encoded image data read from the moving image storage unit 105 is decoded by the encoder/decoder unit 104 via the temporary storage unit 103 and thereafter loaded into the image frame buffer in the temporary storage unit 103 again. The storage control of the encoder/decoder unit 104 is controlled by the "recorder control task" executed by the CPU 107.

The management data read from the moving image storage unit 105 is used in generating on-screen display data (hereinafter, "OSD"). The OSD is an example of a display item and is data for displaying characters and symbols on a screen of the display panel 109. The CPU 107 generates the OSD and writes the generated OSD in the OSD frame buffer in the temporary storage unit 103.

The data storage unit 106 stores programs to be executed by the CPU 107, a predetermined condition for use in color conversion in the case in which the false color mode is set, and information about image capturing settings. The CPU 107 combines contents of the image frame buffer with contents of the OSD frame buffer via the display control unit 110 and transmits to the data communication unit 112 the combined images together with the information about the image capturing settings stored in the data storage unit 106.

The operation key 108 and the touch panel 111 are operation units for receiving user instructions.

The data communication unit 112 transmits the images received from the CPU 107 to the conversion unit 113.

The conversion unit 113 is hardware including image color conversion logic and operates with the temporary storage unit 114 for conversion as a work area. The conversion unit 113 receives the images and the information about the image capturing settings from the data communication unit 112, performs color conversion based on the predetermined condition as needed, and displays the color-converted images on the EVF 115 and the external output I/F 116. The conversion unit 113 functions as an example of a conversion unit.

The EVF 115 is a display unit which displays the color-converted images generated by the conversion unit 113. For example, a liquid crystal panel can be used as the EVF 115.

The external output I/F 116 is an interface for connecting the video camera 100 to an external device. A serial digital interface (SDI), a high-definition multimedia interface (HDMI, registered trademark), for example, can be applicable to the external output I/F 116.

According to the present exemplary embodiment, the EVF 115 displays the OSD together with images being captured, i.e., live view images, or reproduced images stored in the moving image storage unit 105. The display panel 109 displays a menu screen and a setting screen which include only the OSD.

Figure 2B:
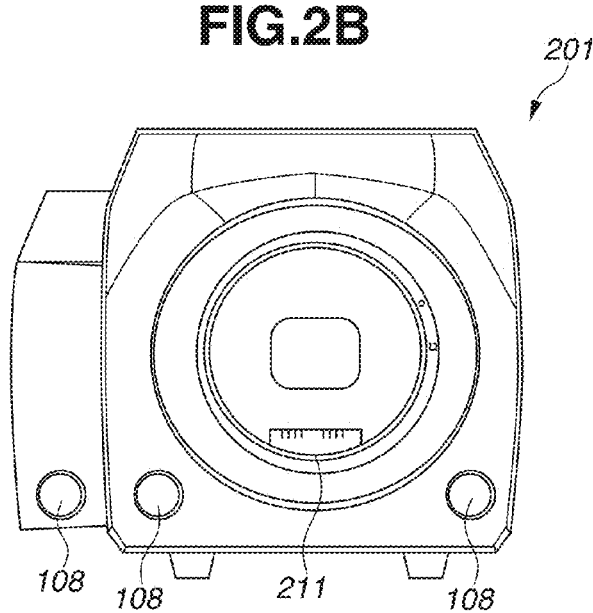

FIGS. 2A and 2B each illustrate an external configuration of the video camera 100. In FIGS. 2A and 2B, components that are similar to those in FIG. 1 are given the same reference numerals, and description thereof is sometimes omitted.

FIG. 2A is a perspective view illustrating the entire configuration of the video camera 100.

The video camera 100 includes a camera body 201 and an EVF body 202.

The camera body 201 includes a holding unit 203 on a top surface, the plurality of operation keys 108, the display panel 109, the touch panel 111, panel operation keys 204, and a body operation dial 205 on side surfaces, and the external output I/F 116, a battery mounting unit 206, and a power supply I/F 207 on a back surface. The panel operation keys 204 and the body operation dial 205 each function as a portion of the operation keys 108. The body operation dial 205 can be rotated and also can be pressed into the camera body 201.

FIG. 2B is a front view illustrating the camera body 201.

The camera body 201 includes the plurality of operation keys 108 and a lens communication unit 211 on a front surface. The lens communication unit 211 includes a part of the camera unit 101.

The EVF body 202 is fixed via a bracket portion 208 attached to the holding unit 203 of the camera body 201. The EVF body 202 includes the EVF 115, EVF operation keys 209, and an EVF operation dial 210. The EVF operation keys 209 and the EVF operation dial 210 each function as a portion of the operation keys 108. The EVF operation dial 210 can be rotated and also can be pressed into the EVF body 202.

The display panel 109 and the touch panel 111 are integrally formed. For example, the touch panel 111 is mounted on an upper layer of a display surface of the display panel 109 in such a manner that the touch panel does not disturb the display of the display panel 109 by decreasing the light transmittance. Then, input coordinates on the touch panel 111 are associated with display coordinates on the display panel 109 to form a graphical user interface (GUI) such that a user can feel as though the user directly operates the screen displayed on the display panel 109. The touch panel 111 can use any one of various methods including a resistive film method, electrostatic capacitance method, surface acoustic wave method, infrared method, electromagnetic induction method, image recognition method, and optical sensor method.

The CPU 107 is capable of detecting the following operations on the touch panel 111 and states.
(1) Touch-down: an operation of touching the touch panel 111 with a finger or pen.
(2) Touch-on: a state in which the touch panel 111 is being touched with a finger or pen.
(3) Move: moving a finger or pen on the touch panel 111 with the finger or pen touching the touch panel 111.
(4) Touch-up: releasing a finger or pen touching the touch panel 111.
(5) Touch-off: a state in which nothing is touching the touch panel 111.

These operations and states and position coordinates of the finger or pen touching the touch panel 111 are notified to the CPU 107. The CPU 107 determines an operation performed on the touch panel 111 based on the notified information.

As to the move, the CPU 107 determines a direction in which a finger or pen is moved on the touch panel 111, for each of vertical and horizontal components, based on changes in the position coordinates. When touch-up is performed after a series of operations involving a touch-down followed by a certain amount of move on the touch panel 111, the CPU 107 determines that a "stroke" is drawn. An operation of quickly drawing a stroke is referred to as a "flick". The flick is an operation of quickly moving a finger on the touch panel 111 by a certain distance with the finger touching the touch panel 111 and then releasing the finger from the touch panel 111. In other words, the flick is an operation of quickly moving a finger along the touch panel 111 in such a manner as to flip the touch panel 111 with the finger. In a case where the CPU 107 detects a move by a predetermined distance or longer at a predetermined speed or faster and then detects a touch-up, the CPU 107 determines that a flick is performed. In a case where the CPU 107 detects a move by a predetermined distance or longer at a speed slower than the predetermined speed, the CPU 107 determines that a "drag" (moving operation) is performed.

Mode control tasks executed by the CPU 107 each operates as follows. Specifically, the mode control task changes the operation state of the entire video camera 100 according to an instruction from the operation keys 108 or the touch panel 111, a request from another task, or a change in internal state managed by the mode control task, and the mode control task notifies each task of an event.

In the present exemplary embodiment, a plurality of modes including an image capturing mode and a reproduction mode is set as an operation mode. A description will now be provided of the case in which the image capturing mode is set. The image capturing mode includes a normal image capturing mode (hereinafter, "normal mode") and a false color mode. Here, the normal mode refers to a mode in which an image is displayed without color conversion, and the false color mode refers to a mode in which colors of an image are converted according to luminance and then the color-converted image is displayed.

A description will be provided of an image which is displayed on the EVF 115 when the normal mode is set and an image which is displayed on the EVF 115 when the false color mode is set. In the present exemplary embodiment, no OSD is displayed. The images are live view images captured by the camera unit 101.

Figure 3A:
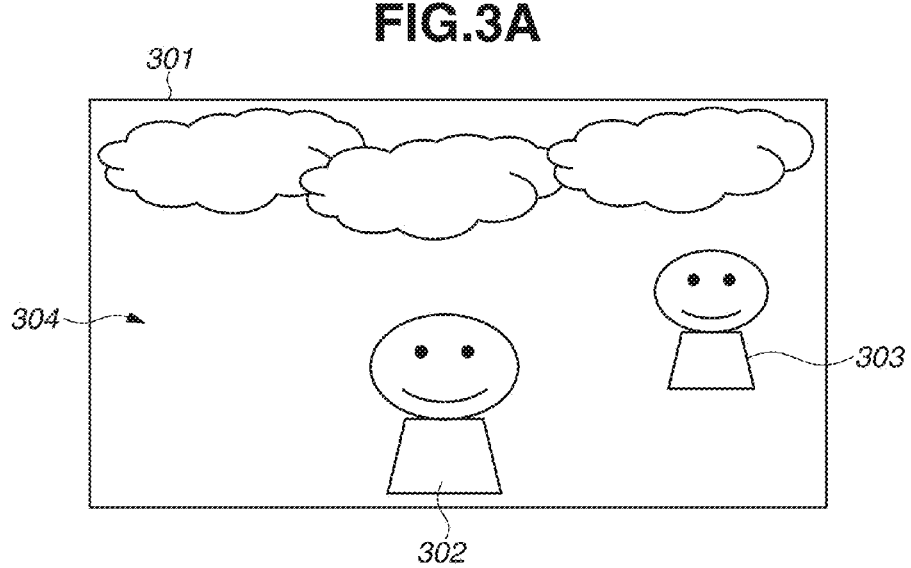
FIGS. 3A and 3B each illustrate an example of an image.

FIG. 3A illustrates an example of a display in the normal mode, and an image 304 including objects 302 and 303 is displayed within a display region 301.

Figure 3B:
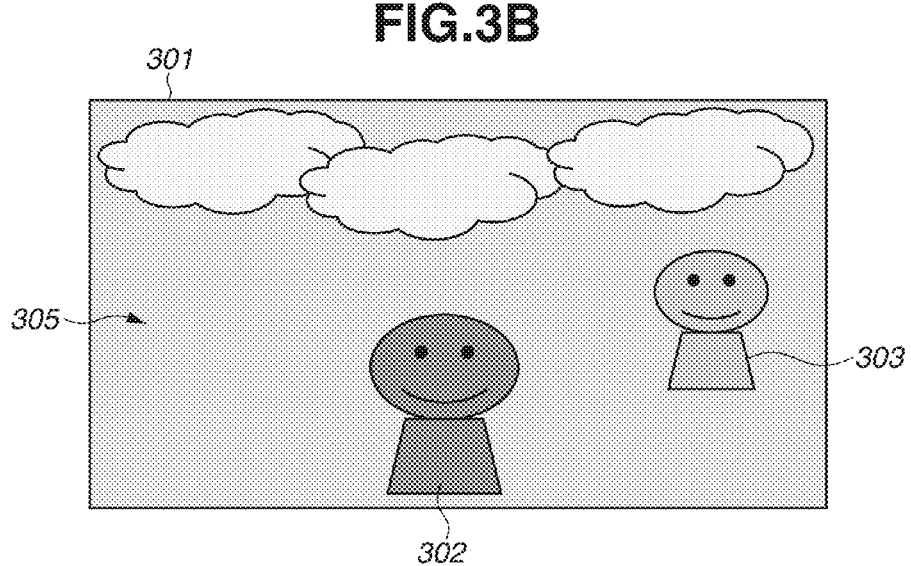

FIG. 3B illustrates an example of a display in the false color mode, and an image 305 including the objects 302 and 303 as in FIG. 3A is displayed within the display region 301.

FIGS. 3A and 3B are different images of the same objects.

Specifically, FIG. 3B is an image generated by color conversion of the image 304 in FIG. 3A according to luminance. In the false color mode, colors of an image are converted according to luminance into, for example, purple (low luminance: underexposed), blue (low luminance: possibly underexposed), green (correctly exposed), pink (correctly exposed: within a predetermined range), yellow (high luminance: possibly overexposed), or red (high luminance: overexposed). At this time, there can be a portion the color of which is not converted depending on luminance. In below-described figures including FIG. 3B, a difference in color after color conversion is represented by a shade level of gray.

A description will now be provided an example of a display in which visibilities of an image and OSD are decreased with the image and the OSD being displayed together on the EVF 115 in the false color mode.

Figure 4A:
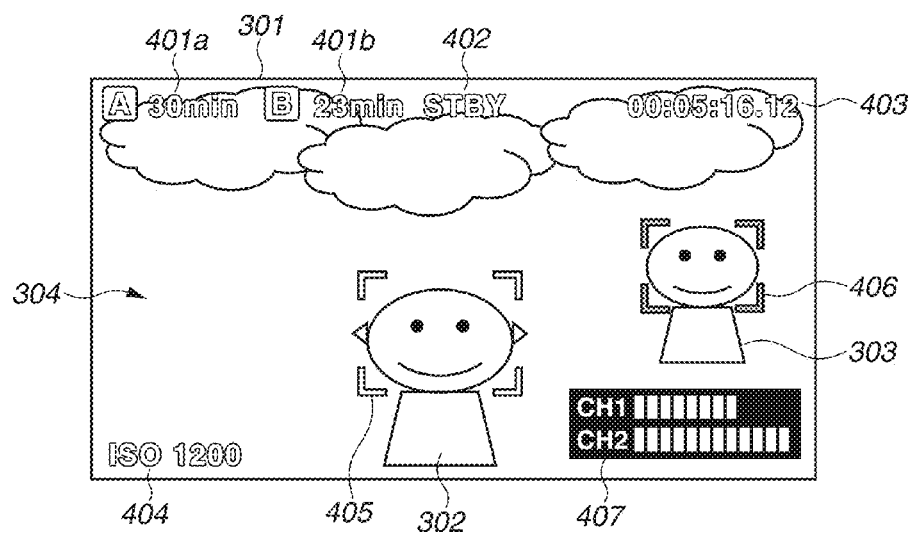
FIGS. 4A and 4B each illustrate an example of a case in which on-screen display data (OSD) is displayed together with an image.

FIG. 4A illustrates an example of a display in the normal mode. In FIG. 4A, remaining recording times 401*a* and 401*b*, a recording state 402, a time code 403, setting information 404, a main object face frame 405, a sub-object face frame 406, and a volume level meter 407 are superimposed and displayed as OSD on the image 304.

Figure 4B:
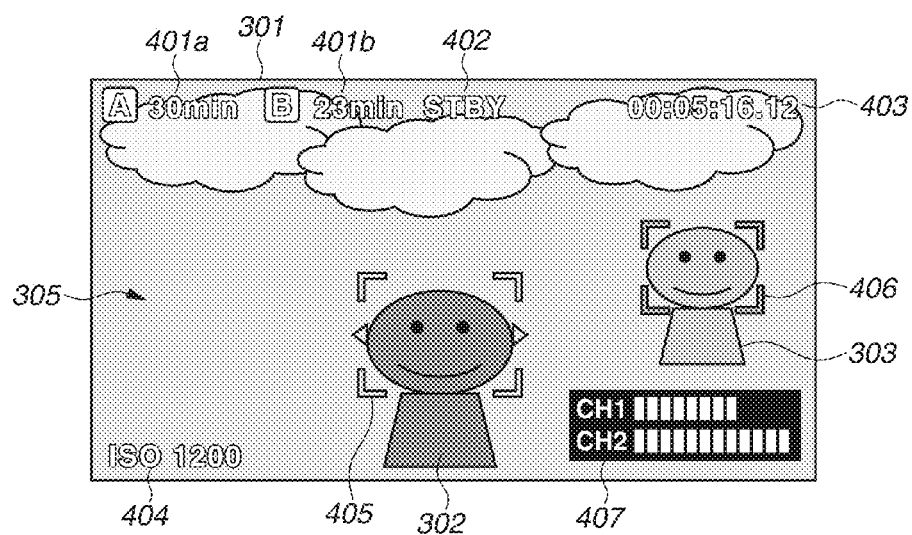

FIG. 4B illustrates an example of a display in the false color mode. In FIG. 4B, the remaining recording times 401*a* and 401*b*, the recording state 402, the time code 403, the setting information 404, the main object face frame 405, the sub-object face frame 406, and the volume level meter 407 are superimposed and displayed as OSD on the image 305.

At this time, as an example, the remaining recording times 401*a* and 401*b* are displayed in green when there is time left, or displayed in red when there is no time left. By contrast, green and red each indicate predetermined luminance in the false color mode. Accordingly, display of the OSD superimposed on the color-converted image 305 leads to mix-up of the colors as illustrated in FIG. 4B, resulting in decreased visibility. Furthermore, the color of a portion of the image 305 on which the OSD having a large display region area, such as the volume level meter 407, is invisible. The OSD itself can be converted depending on the settings, which decreases visibility.

A description now will be provided of an example of a display according to the present exemplary embodiment in which visibilities of a color-converted image and OSD are not decreased even in a case where the OSD is displayed with the false color mode being set.

Figure 5A:
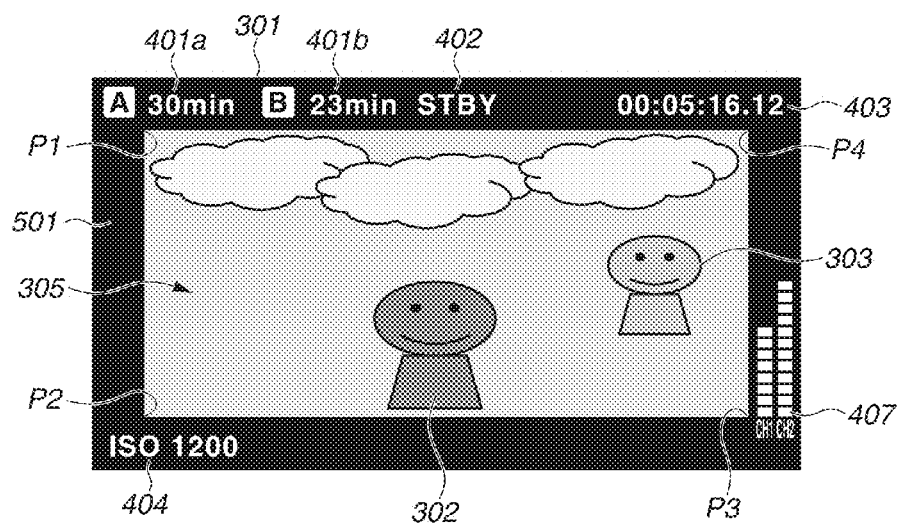
FIGS. 5A and 5B each illustrate an example of a case in which OSD is displayed together with an image.

FIG. 5A illustrates an example of a display in the false color mode according to the present exemplary embodiment. In FIG. 5A, the size of the image 305 is reduced with respect to the display region 301 and displayed in the center of the display region 301, and a blank region 501 colored black is displayed as an item display region around the image 305. In the blank region 501, the remaining recording times 401*a* and 401*b*, the recording state 402, the time code 403, the setting information 404, and the volume level meter 407 are displayed as OSD. FIG. 5A is different from FIG. 4B in that the main object face frame 405 and the sub-object face frame 406 are not displayed and the design and size of the volume level meter 407 are changed.

As described above, the OSD is displayed in the blank region 501 to prevent the color of the color-converted image from being mixed up with the colors of the OSD so that visibilities of the color-converted image and the OSD are increased. The volume level meter 407 having a large display area is required to be visible even during image recording, so the position and shape of the volume level meter 407 are changed such that the volume level meter 407 fits in the blank region 501. The main object face frame 405 and the sub-object face frame 406, which are needed in focus adjustment, do not have to be visible in the false color mode in luminance adjustment, so that the main object face frame 405 and the sub-object face frame 406 are temporarily hidden. During false color mode, some of the display items of the OSD may be hidden. The hidden display items may be items which contain information that is not relevant to the function and/or purpose of the false color mode. The function and/or purpose of the false color mode may be based upon the predetermined condition(s) upon which the false color mode is based. In other words, the OSD provides information that is displayed for a purpose (e.g., focus adjustment) different from a purpose (e.g., luminance adjustment) of image color conversion in the false color mode is hidden.

A description will now be provided of an example of a display according to the present exemplary embodiment in which a warning is displayed when a color-converted image and OSD is displayed with the false color mode being set.

Figure 5B:
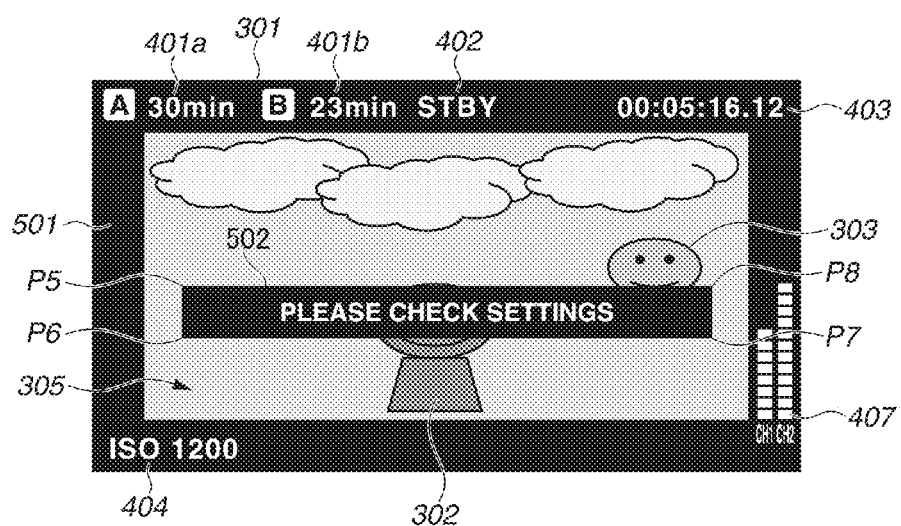

FIG. 5B illustrates an example of a display including a warning in the false color mode according to the present exemplary embodiment. FIG. 5B is different from FIG. 5A in that the warning is displayed as OSD in a warning region 502 in a center. In FIG. 5B, the warning includes the character string "Please check the settings". The warning region 502 is hidden when a predetermined time elapses after the start of the display.

As described above, even in the false color mode, important information and the warning region 502, which is hidden after the predetermined time elapses, are superimposed and displayed on the image 305, so that the user is prevented from missing the display.

A description will now be provided of screen transitions at the time of switching between the normal mode and the false color mode. The video camera 100 according to the present exemplary embodiment is alternately switched between the normal mode and the false color mode each time a user presses a switching key included in the operation keys 108. Mode setting values are predetermined for the normal mode and the false color mode, and the CPU 107 stores in the temporary storage unit 103 the mode setting value that corresponds to a current mode.

In each of the normal mode and the false color mode, an image can be displayed in different forms switched in stages. More specifically, each time a user presses a DISP key included in the operation keys 108, a display level (display stage) is changed in order, in each of the normal mode and the false color mode. Level values are individually predetermined for each of the display levels in the normal mode and the false color mode, and the CPU 107 stores in the temporary storage unit 103 the level value that corresponds to a current display level.

The operation key 108 for switching between the normal mode and the false color mode, or the operation key 108 for switching the display stage can be assigned to, for example, a key or button on the menu screen displayed on the display panel 109.

FIG. 6 illustrates an example of screen transitions in the normal mode and the false color mode. Each solid arrow indicates a destination of a screen transition at the press of the switching key. A switch is made between a screen in the normal mode and a screen in the false color mode to display the switched screen. Each dashed arrow indicates a destination of a screen transition at the press of the DISP key. A switch is made between screens of the respective display stages in the normal mode or in the false color mode to display the switched screen.

In FIG. 6, screens 601 to 603 are the screens of the respective display levels to be switched and displayed in the normal mode, and screens 604 and 605 are the screens of the respective display levels to be switched and displayed in the false color mode. The screens 601 to 605 have different display forms.

The screen 601 is a screen in which the size of an image is not reduced and OSD is superimposed. If the DISP key is pressed in the state of the screen 601, the display level is switched in the normal mode, and the screen 601 is changed to the screen 602.

The screen 602 is a screen in which the size of the image is reduced and the OSD is superimposed. If the DISP key is pressed in the state of the screen 602, the display level is switched in the normal mode, and the screen 602 is changed to the screen 603.

The screen 603 is a screen in which the size of the image is not reduced and the OSD is not displayed. If the DISP key is pressed in the state of the screen 603, the display level is switched in the normal mode, and the screen 603 is changed back to the screen 601.

Here, information which indicates the order of the level values in the screen transitions when the display level is switched is stored in the data storage unit 106. Thus, the CPU 107 determines the next transition destination screen by referring to the information which indicates the order of the level values. In this manner, the display level is switched by press of the DISP key in the normal mode.

With the switching key being pressed in the state of displaying the screen 601, the mode is switched from the normal mode to the false color mode, and the screen 601 is changed to the screen 604. The screen 604 is a screen in which the image is reduced and the OSD is located in a blank region, as in FIG. 5A. Since the mode is changed to the false color mode, a color-converted image is displayed.

With the switching key being pressed in the state of displaying the screen 602, the mode is switched from the normal mode to the false color mode, and the screen 602 is changed to the screen 604.

With the switching key being pressed in the state of displaying the screen 603, the mode is switched from the normal mode to the false color mode, and the screen 603 is changed to the screen 605. The screen 605 is a screen in which the image is not reduced and the OSD is not displayed. Since the mode is changed to the false color mode, the color-converted image is displayed.

Here, information which indicates the order of the level values in the screen transitions when the mode is switched from the normal mode to the false color mode is stored in the data storage unit 106. Thus, the CPU 107 determines the next transition destination screen by referring to the information which indicates the order of the level values.

As described above, in a case where the OSD is displayed when the mode is switched from the normal mode to the false color mode, the OSD is continued to be displayed as in the transition from the screen 601 or 602 to the screen 604 in FIG. 6. In a case where the OSD is not displayed, the OSD is continued to be hidden as in the transition from the screen 603 to the screen 605 in FIG. 6. Accordingly, when the mode is switched to the false color mode, the image is switched to the color-converted image and the OSD is continued to be displayed or hidden to prevent a user from feeling strange about the display when the image is switched.

With the DISP key being pressed in the state of displaying the screen 604, the display level is switched in the false color mode, and the screen 604 is changed to the screen 605.

With the DISP key being pressed in the state of displaying the screen 605, the display level is switched in the false color mode, and the screen 605 is changed to the screen 604.

Here, information which indicates the order of the level values in the screen transitions when the display level is switched is stored in the data storage unit 106. Thus, the CPU 107 determines the next transition destination screen by referring to the information which indicates the order of the level values. In this manner, the display level is switched at the press of the DISP key in the false color mode.

With the switching key being pressed in the state of displaying the screen 604 or 605, the mode is switched from the normal mode to the false color mode, and the screen 604 or 605 is switched to one of the screen 601 to 603. The transition destination screen is the last one of the screens 601 to 603 set in the normal mode. For example, in a case where the screens 601, 604, and 605 are switched in this order and the switching key is pressed in the state of displaying the screen 605 to switch to the normal mode, the screen 605 is changed to the screen 601, which is the last set screen.

FIG. 7 is a flow chart illustrating display control which is performed in displaying an image on the display region 301 of the EVF 115 of the video camera 100. The CPU 107 reads a program from the data storage unit 106, loads the program into the temporary storage unit 103, and executes the program to realize the flow chart illustrated in FIG. 7. The flow chart is started with the image capturing mode being set to the operation mode.

In the present exemplary embodiment, the level value of the display level set last in the normal mode is stored in the data storage unit 106. The mode setting value of the current mode which is one of the normal mode and the false color mode and the level value of the current display level are stored in the temporary storage unit 103.

In step S701, the CPU 107 initializes the mode setting value stored in the temporary storage unit 103 and the level value of the display level. Next, the CPU 107 stores the initialized mode setting value of the normal mode in the temporary storage unit 103, reads from the data storage unit 106 the level value of the display level set last in the normal mode, and stores the read level value in the temporary storage unit 103. In other words, a first image to be displayed after the image capturing mode is set can be displayed in the normal mode.

In step S702, the CPU 107 determines whether the current mode is the false color mode. More specifically, the CPU 107 reads the mode setting value stored in the temporary storage unit 103 to determine whether the current mode is the false color mode. In a case where the processing proceeds to step S702 for the first time after the start of the flow chart, since the mode setting value of the normal mode is stored in the temporary storage unit 103 in step S701, the mode setting value of the normal mode is read.

If the CPU 107 determines that the current mode is the false color mode (YES in step S702), the processing proceeds to step S703. If the CPU 107 determines that the current mode is not the false color mode (NO in step S702), i.e., if the current mode is the normal mode, the processing proceeds to step S704.

In step S703, the CPU 107 reads the level value stored in the temporary storage unit 103 to acquire the display level in the false color mode, and the processing proceeds to step S705. In step S704, the CPU 107 reads the level value stored in the temporary storage unit 103 to acquire the display level in the normal mode, and the processing proceeds to step S705.

In step S705, the CPU 107 generates an OSD region list according to the acquired display level and transmits the generated OSD region list to the conversion unit 113 via the data communication unit 112. Here, the OSD region list refers to a list in which information about positions of OSD display regions is described.

For example, in the cases of the display levels corresponding to the screens 602 and 604 in FIG. 6, the OSD region list includes coordinates of points P1 to P4 defining the blank region 501 (refer to FIG. 5A). In the case of displaying the warning region 502, the OSD region list includes coordinates of points P5 to P8 defining the warning region 502 (refer to FIG. 5B).

In the cases of the display levels corresponding to the screens 601, 603, and 605 in FIG. 6, the CPU 107 generates no OSD region list.

In step S706, the CPU 107 performs image size reduction processing according to the acquired display level via the display control unit 110. In the present exemplary embodiment, the CPU 107 reduces the size of the image captured by the camera unit 101 at a reduction rate stored in advance in the data storage unit 106. The reduction rate is set to a value such that the image, the size of which has been reduced, in the display region 301 fits in the region other than the blank region 501, i.e., central region.

For example, in the cases of the display levels corresponding to the screens 602 and 604 in FIG. 6, the CPU 107 performs image size reduction processing. On the other hand, in the cases of the display levels corresponding to the screens 601, 603, and 605 in FIG. 6, the CPU 107 does not perform image size reduction processing.

In step S707, the CPU 107 performs OSD display control according to the acquired display level via the display control unit 110. More specifically, the CPU 107 determines display content and display position of the corresponding piece of the OSD and combines the OSD with the image with the determined display contents at the determined display positions.

Here, the display contents of the remaining recording times 401a and 401b among the OSD is determined based on free-space information acquired from a recording medium. The display contents of the recording state 402, the time code 403, and the setting information 404 are determined based on information acquired from the camera unit 101 and information stored in the temporary storage unit 103 or the moving image storage unit 105. The display contents of the volume level meter 407 are determined based on information acquired from a microphone portion (not illustrated).

The display positions of the remaining recording times 401a and 401b, the recording state 402, the time code 403, the setting information 404, and the volume level meter 407 are stored in advance in the data storage unit 106 in association with the respective display levels. In the cases of the display levels corresponding to the screens 602 and 604 in FIG. 6, the volume level meter 407 is displayed in a form that fits in the blank region 501. The display positions of the main object face frame 405 and the sub-object face frame 406 are determined based on the positions at which the respective faces are detected from the image by the CPU 107.

For example, in the case of the display level corresponding to the screen 601 in FIG. 6, the OSD is combined with the image 304 based on the determined display contents and the determined display positions. At this time, since the size of the image 304 is not reduced, the OSD is superimposed on the image 304.

In the cases of the display levels corresponding to the screens 602 and 604 in FIG. 6, the OSD is combined with the image 304 such that the OSD is located within the blank region 501 based on the determined display contents and the determined display positions. At this time, since the size of the image 304 is reduced to fit in the region other than the blank region 501, the OSD is not superimposed on the image 304. In the case of the display level corresponding to the screen 604 in FIG. 6, the main object face frame 405 and the sub-object face frame 406 among the OSD is hidden.

In the cases of the display levels corresponding to the screens 603 and 605 in FIG. 6, the OSD is not combined.

The CPU 107 transmits the combined image data to the conversion unit 113 via the display control unit 110 and the data communication unit 112.

In step S708, the conversion unit 113 determines whether the current mode is the false color mode. The processing performed in step S708 is similar to the processing performed in step 3702. If the CPU 107 determines that the current mode is the false color mode (YES in step S708), the processing proceeds to step S709. If the CPU 107 determines that the current mode is not the false color mode (NO in step S708), i.e., if the current mode is the normal mode, the processing proceeds to step S710.

In step S709, the conversion unit 113 performs color conversion, based on a predetermined condition, on a region of the received image data other than the region described in the OSD region list (i.e., the blank region 501). Since the size-reduced image 304 is positioned in the region other than the blank region 501, the conversion unit 113 performs color conversion only on the size-reduced image 304. The color conversion based on the predetermined condition refers to processing in which the color of each pixel of an image is converted into purple, blue, green, pink, yellow, and red among other colors according to the luminance, as described above, or processing in which the color conversion is not performed depending on the luminance.

Thus, in the display region 301 of the EVF 115, the color-converted image 305 is displayed in the center, and the OSD is displayed in the blank region 501 on which the image 305 is not superimposed, as illustrated in FIG. 5A. In other words, the color-converted image 305 and the OSD is displayed with the color of the color-converted image 305 not being mixed up with the colors of the OSD, so that visibility of the OSD is increased. Furthermore, since the OSD is not superimposed on the image 305, visibility of the color-converted image 305 is also increased. In the case of the OSD region list including the warning region 502, the conversion unit 113 performs color conversion, based on the predetermined condition, on a region other than the blank region 501 and other than the warning region 502.

In step S710, the conversion unit 113 displays an image on the display region 301 of the EVF 115. Specifically, one of the images of the display levels of the screens 601 to 605 illustrated in FIG. 6 is displayed. In a case where the processing proceeds from step S708 to step S710 via step S709, the color-converted image is displayed (false color mode). In a case where the processing proceeds from step S708 to step S710 directly without via step S709, the non-color-converted image, the color of which is not converted is displayed (normal mode).

In step S711, the CPU 107 determines whether an instruction to change to a mode other than the image capturing mode is given via the operation keys 108. If the CPU 107 determines that an instruction to change to a mode other than the image capturing mode is given (YES in step S711), the image capturing mode is ended. If the CPU 107 determines that no instruction to change to a mode other than the image capturing mode is given (NO in step S711), the processing proceeds to step S712.

In step S712, the CPU 107 determines whether an instruction to change the display level is given. Specifically, the CPU 107 determines whether the DISP key is pressed. If the CPU 107 determines that an instruction to change the display level is given (YES in step S712), the processing proceeds to step S713. If the CPU 107 determines that no instruction to change the display level is given (NO in step S712), the processing proceeds to step S716.

In step S713, the CPU 107 determines whether the current mode is the false color mode. The processing performed in step S713 is similar to the processing performed in step S702. If the CPU 107 determines that the current mode is the false color mode (YES in step 3713), the processing proceeds to step 3714. If the CPU 107 determines that the current mode is not the false color mode (NO in step S713), i.e., if the current mode is the normal mode, the processing proceeds to step S715.

In step 3714, the CPU 107 changes the display level in the false color mode. More specifically, the CPU 107 changes the level value stored in the temporary storage unit 103 to the next level value and stores the next level value in the temporary storage unit 103. The CPU 107 can change the level value based on the information which indicates the order of the level values and is stored in the data storage unit 106.

For example, in the case of the level value of the display level corresponding to the screen 604 in FIG. 6, the level value is changed to the level value of the display level corresponding to the screen 605. In the case of the level value of the display level corresponding to the screen 605 in FIG. 6, the level value is changed to the level value of the display level corresponding to the screen 604. The processing then returns to step S702, and the above-described processing is repeated so that the image corresponding to the display level changed in the false color mode is displayed in step S710. At this time, the display contents of the OSD are also updated. This processing switches and displays the screens 604 and 605 in FIG. 6.

In step S715, the CPU 107 changes the display level in the normal mode. More specifically, the CPU 107 changes the level value stored in the temporary storage unit 103 to the next level value and stores the next level value in the temporary storage unit 103. The CPU 107 can change the level value based on the information which indicates the order of the level values and is stored in the data storage unit 106.

For example, in the case of the level value of the display level corresponding to the screen 601 in FIG. 6, the level value is changed to the level value of the display level corresponding to the screen 602. In the case of the level value of the display level corresponding to the screen 602 in FIG. 6, the level value is changed to the level value of the display level corresponding to the screen 603. In the case of the level value of the display level corresponding to the screen 603 in FIG. 6, the level value is changed to the level value of the display level corresponding to the screen 601.

The CPU 107 updates the level value in the data storage unit 106 with the changed level value and stores the updated level value in the data storage unit 106. More specifically, the changed level value is stored in the data storage unit 106 as the level value of the display level set last in the normal mode.

The processing then returns to step S702, and the above-described processing is repeated so that the image corresponding to the display level changed in the normal mode is displayed in step S710. Through this processing, the screens 601, 602, and 603 illustrated in FIG. 6 are switched and displayed.

In step S716, the CPU 107 determines whether an instruction to switch between the normal mode and the false color mode is given. More specifically, the CPU 107 determines whether the switching key included in the operation keys 108 is pressed. If the CPU 107 determines that an instruction to switch between the normal mode and the false color mode is given (YES in step S716), the processing proceeds to step S717. If the CPU 107 determines that no instruction to switch between the normal mode and the false color mode is given (NO in step S716), the processing returns to step S702.

In step S717, the CPU 107 determines whether the current mode is the false color mode. The processing performed in step S717 is similar to the processing performed in step S702. If the CPU 107 determines that the current mode is the false color mode (YES in step S717), the processing proceeds to step S718. If the CPU 107 determines that the current mode is not the false color mode (NO in step S717), i.e., if the current mode is the normal mode, the processing proceeds to step S719.

In step S718, the CPU 107 changes from the false color mode to the normal mode. More specifically, the CPU 107 updates the mode setting value of the false color mode stored in the temporary storage unit 103 with the mode setting value of the normal mode and stores the updated mode setting value in the temporary storage unit 103. The CPU 107 then reads the level value of the display level stored in the data storage unit 106 and updates the level value stored in the temporary storage unit 103 with the read level value and stores the updated level value in the temporary storage unit 103. The processing then returns to step S702, and the above-described processing is repeated so that the image of the display level set last in the previous normal mode is displayed in step S710.

In step S719, the CPU 107 changes from the normal mode to the false color mode. More specifically, the CPU 107 updates the mode setting value of the normal mode stored in the temporary storage unit 103 with the mode setting value of the false color mode and stores the updated mode setting value in the temporary storage unit 103. The CPU 107 then updates the level value of the display level based on the information which indicates the order of the level values and is stored in advance in the data storage unit 106, and stores the updated level value.

For example, in the cases of the level values of the display levels corresponding to the screens 601 and 602 in FIG. 6, the level value is changed to the level value of the display level corresponding to the screen 604. In the case of the level value of the display level corresponding to the screen 603 in FIG. 6, the level value is changed to the level value of the display level corresponding to the screen 605.

The processing then returns to step S702, and the above-described processing is repeated so that the image of the display level in the false color mode is displayed in step S710. In the transition from the screen 602 to the screen 604 and the transition from the screen 603 to the screen 605 in FIG. 6, the image of the normal mode is simply switched to the color-converted image, and the state in which the OSD is displayed or the state in which the OSD is hidden is maintained, preventing a user from feeling strange about the display.

In a case where an instruction to change to a different mode is given in step S711 and the image capturing mode is to be ended, the level value of the display level set last in the normal mode is not erased and is continued to be stored in the data storage unit 106. Thus, if the image capturing mode is set again and the processing proceeds to step S701, the CPU 107 reads from the data storage unit 106 the level value of the display level set last in the normal mode. The CPU 107 stores the read level value in the temporary storage unit 103, so that in step S710, the display level set last in the normal mode is displayed.

An interval between the display of the image in step S710 and the next display of the image in step S710 in a repeat of the flow chart illustrated in FIG. 7 can be a predetermined time set in advance, or the next display can be synchronized with the time of an update of an image of the next frame. In other words, the CPU 107 can make the processes of steps S702 to S710 sleep for a predetermined time to synchronize the next display with the update of the image of the next frame.

Even in the false color mode, the CPU 107 temporarily displays the image the color of which is not converted in a case of a display relating to settings, such as the menu screen for changing the settings of the video camera 100 or a status screen for checking the settings of the video camera 100. The menu screen and the status screen each include a list of a plurality of items and a display region which does not fit in the blank region 501.

As described above, in the present exemplary embodiment, the display items are displayed in positions in which the display items are not superimposed on the color-converted image. In this way, even in a case where the color-converted image and the display items have similar color, visibility of the color-converted image and the display items is increased.

In the present exemplary embodiment, in the case of displaying the image the color of which is not converted, since the color of the image is normally different from the colors of the display items, the display items are superimposed and displayed on the image the color of which is not converted. In this way, visibility of the display items is increased.

In the present exemplary embodiment, in the case of displaying the color-converted image, the color-converted image is reduced in size to be displayed, compared with the case of displaying the image the color of which is not converted (the case in which the screen 601 is switched to the screen 604) in the present exemplary embodiment. In this way, the display items can be displayed so as to avoid superimposition on the image with ease. In the case of displaying the image the color of which is not converted, the image is enlarged and displayed compared with the case of displaying the color-converted image (the case in which the screen 604 is switched to the screen 601 or 603). Accordingly, in the case of displaying the image the color of which is not converted, visibility of the image can be increased.

In the present exemplary embodiment, the CPU 107 temporarily stores the image data encoded by the encoder/decoder unit 104 in the temporary storage unit 103 and then stores the image data in the moving image storage unit 105. At this time, even in the case of displaying the color-converted image, the image on which color conversion is to be performed is stored in the moving image storage unit 105, so that the color-converted image is prevented from being stored.

While the case in which only the main object face frame 405 and the sub-object face frame 406 are hidden in the false color mode is described in the present exemplary embodiment, this is not a limiting case. The CPU 107 can also hide the display item that does not relate to the false color mode (the mode in luminance adjustment in the present exemplary embodiment), such as a marker.

While the case in which color conversion is performed according to luminance is described as an example of the false color mode in the present exemplary embodiment, this is not a limiting case. For example, the false color mode can be a zebra mode in which the CPU 107 detects portions each having a predetermined luminance value or higher from an image and the conversion unit 113 converts the color of the detected portions into a striped pattern. Alternatively, the false color mode can be a peaking mode in which the CPU 107 detects focused portions from an image based on focus information about the image and the conversion unit 113 converts the color of the detected portions. Furthermore, the false color mode can be a one-point color mode in which the CPU 107 detects portions each having a color designated by a user from an image and the conversion unit 113 converts the color of portions other than the detected portions into black and white. The false color mode can be a switch color mode in which the CPU 107 detects portions each having a color designated by a user from an image and the conversion unit 113 converts the color of the detected portions into a different color.

A second exemplary embodiment is described below. In the present exemplary embodiment, the data communication unit 112, the conversion unit 113, and the temporary storage unit 114 for conversion according to the first exemplary embodiment are omitted, and the display control unit 110 is directly connected to the EVF 115 and the external output I/F 116. In place of the conversion unit 113, which is omitted, the CPU 107 performs color conversion processing on images via the display control unit 110. The color-converted images can be displayed not only on the EVF 115 and the external output I/F 116 but also on the display panel 109.

Here, the CPU 107 performs color conversion on an image via the display control unit 110 before combining the image with OSD, and then combines the color-converted image with the OSD. Thus, the OSD, for example, the main object face frame 405 and the sub-object face frame 406 can be superimposed and displayed on the color-converted image. In such a case, the CPU 107 displays the superimposed OSD in a different color so that the color of the OSD is not mixed up with colors used in color conversion (e.g., purple, blue, green, pink, yellow, red). More specifically, edges of the face frames can be displayed in black and the inside of the edges in white.

In the present exemplary embodiment, since the color of the image that is to be combined with the OSD is converted, the determination of the OSD region is unnecessary, the process of generating the OSD region list in step S705 FIG. 7 can be omitted. In the present exemplary embodiment, since the color-converted image is combined with the OSD, the OSD display control processing in step S707 in FIG. 7 is performed immediately after the color conversion processing in step S709.

As described above, in the present exemplary embodiment, color conversion is performed on the image that is to be combined with the OSD. Thus, color conversion can be performed without determination of regions in which the OSD is to be positioned, simplifying the processing.

While the present invention has been described with reference to the exemplary embodiments, it is to be understood that the invention is not limited to the above-described exemplary embodiments and various changes and modifications made without departing from the spirit of the invention are also encompassed within the scope of the invention. The above-described exemplary embodiments are mere illustrations of exemplary embodiments of the invention and can be combined as appropriate.

In the above-described exemplary embodiments, the control of the CPU 107 and the conversion unit 113 can be performed by a single hardware device, or a plurality of hardware devices can control the entire apparatus by sharing the processing.

While the case of converting the color of a live view image is described in the above-described exemplary embodiments, this is not a limiting case, and an exemplary embodiment of the present invention is also applicable to a case in which the color of a still image captured by the camera unit 101 or a reproduction image is converted.

While the case in which an exemplary embodiment of the present invention is applied to the video camera 100 is described as an example in the above-described exemplary embodiments, this is not a limiting case, and an exemplary embodiment of the present invention is also applicable to an apparatus capable of displaying an image the color of which is converted based on a predetermined condition. More specifically, an exemplary embodiment of the present invention is also applicable to a digital camera, mobile phone terminal, smartphone, tablet terminal, mobile image viewer, and digital photo frame among other apparatuses.

According to the exemplary embodiments, visibility of a color-converted image and a display item is increased in a case where the display item is displayed together with the image.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079077, filed Apr. 11, 2016, which is hereby incorporated by reference herein in its entirety.

What is claimed is:

1. A display control apparatus configured to control a display of an image, the display control apparatus comprising:
   one or more processors;
   a conversion unit configured to convert a color of the image based on a predetermined condition; and
   a display control unit configured to perform control such that, in a case where a non-color-converted image is displayed in which the color of the non-color-converted image is not converted, a display item is displayed at a superimposed position at which the display item is superimposed on the image, and in a case where a color-converted image is displayed in which the color of the color-converted image is converted, the display item is displayed at a non-superimposed position at which the display item is not superimposed on the color-converted image.

2. The display control apparatus according to claim 1, wherein, in a case where the non-color-converted image is displayed and the display item is displayed at the superimposed position on the non-color-converted image, based on an instruction to execute conversion by the conversion unit, the display control unit performs control such that the color-converted image is displayed in place of the non-color-converted image, and the display item is displayed at the non-superimposed position on the color-converted image.

3. The display control apparatus according to claim 1, wherein, in the case where the color-converted image is displayed, the display control unit performs control such that the color-converted image is reduced in size to be displayed in a smaller size than a size of the non-color-converted image in a case where the non-color-converted image is displayed.

4. The display control apparatus according to claim 3, wherein, in a case where the display item is hidden and in the case where the color-converted image is displayed, the display control unit performs control such that the color-converted image is displayed without being reduced in size.

5. The display control apparatus according to claim 1, wherein, in the case where the color-converted image is displayed, the display control unit performs control such that the display item is displayed around the color-converted image.

6. The display control apparatus according to claim 1, wherein the display control unit performs control such that a shape of the display item displayed in a case where the color-converted image is displayed is different from the shape of the display item displayed in a case where the non-color-converted image is displayed.

7. The display control apparatus according to claim 1, wherein the display control unit performs control such that, in the case where the non-color-converted image is displayed, a plurality of display items are displayed at a plurality of superimposed positions at which the plurality of display items are superimposed on the non-color-converted image, and in the case where the color-converted image is displayed, at least one of the plurality of display items is hidden.

8. The display control apparatus according to claim 7, wherein the at least one of the plurality of display items which are hidden is a display item which displays information for a function different from a function of the image color conversion by the conversion unit.

9. The display control apparatus according to claim 1, wherein, in a case where the display item is at least one of a display item to be hidden after a predetermined time elapses and a display item for a warning, and in the case where the color-converted image is displayed, the display control unit performs control such that the display item is displayed at the superimposed position on the color-converted image.

10. The display control apparatus according to claim 1, wherein in a case where a display item related to a setting of the display control apparatus is displayed, and in the case where the color-converted image is displayed, the display control unit performs control such that the display item is temporarily superimposed and displayed on the non-color-converted image.

11. The display control apparatus according to claim 1, wherein the conversion unit converts a color of the image based on, as the predetermined condition, either one of luminance of the image and a color designated by a user.

12. The display control apparatus according to claim 1, further comprising an image capturing unit configured to capture the image of an object,
wherein the conversion unit converts the color of the image based on, as the predetermined condition, focus information about the image captured by the image capturing unit.

13. The display control apparatus according to claim 1, further comprising a storage control unit configured to store the image in a storage unit,
wherein the storage control unit stores the image the color of which is to be converted by the conversion unit.

14. A method for controlling a display control apparatus configured to control a display of an image, the method comprising:
converting a color of the image based on a predetermined condition; and
performing control such that, in a case where a non-color-converted image is displayed in which the color is not converted, a display item is displayed at a superimposed position at which the display item is superimposed on the non-color-converted image, and in a case where a color-converted image is displayed in which the color of the color-converted image is converted, the display item is displayed at a non-superimposed position at which the display item is not superimposed on the color-converted image.

15. A non-transitory computer-readable storage medium storing a program for causing a computer to function as display control apparatus comprising instructions for:
converting a color of the image based on a predetermined condition; and
performing control such that, in a case where a non-color-converted image is displayed in which the color is not converted, a display item is displayed at a superimposed position at which the display item is superimposed on the non-color-converted image, and in a case where a color-converted image is displayed in which the color of the color-converted image is converted, the display item is displayed at a non-superimposed position at which the display item is not superimposed on the color-converted image.

* * * * *